April 21, 1959

W. S. KLECZEK 2,882,924

VENT AND RELIEF VALVE

Filed April 16, 1954

Inventor:
Walter S. Kleczek,
by *[signature]*
His Attorney.

Inventor:
Walter S. Kleczek,
by Clarke H. Mott
His Attorney.

United States Patent Office 2,882,924
Patented Apr. 21, 1959

2,882,924

VENT AND RELIEF VALVE

Walter S. Kleczek, Schenectady, N.Y., assignor to General Electric Company, a corporation of New York Application April 16, 1954, Serial No. 423,709

3 Claims. (Cl. 137—522)

This invention relates to a valve and more particularly to a combination vent and relief valve.

Many pressure systems must at times be vented to the atmosphere or to a discharge line and must at other times be closed, but provided with some type of pressure relieving means. Examples of such systems are fuel systems, liquid oxygen systems, hydrogen peroxide systems, as well as other liquid systems and gas systems.

Heretofore on occasion such pressure systems have been provided with a vent valve and with a separate relief valve. From the standpoint of savings in costs of manufacture, savings in weight of the valve unit and in the space it occupies, and from the standpoint of efficiency of operation, it is desirable to have a single valve which is simple and compact and which combines the vent and relieving functions.

It is an important object, therefore, of this invention to provide a single compact valve capable of performing both of the above-mentioned functions, namely, of selectively venting and relieving a pressure system.

Other objects of this invention are to provide: a combination vent and relief valve having the same flowway and the same valve members serving for both the vent and relief functions; a combination vent and relief valve which, when operated as a relief valve, has a low differential between the opening and closing pressures; a combination vent and relief valve having the characteristic that when the valve is relieving, as the flow increases, the pressure of the system being relieved decreases; a combination vent and relief valve in which the opening or cracking pressure is the highest pressure to which the system being relieved will be subjected; a combination vent and relief valve having a high relieving capacity, and having a pressure relieving valve member which is movable within the valve body with very low friction.

These and other objects will become apparent and the invention will be better understood from the following description taken in connection with the accompanying drawings, and the scope of the invention will be pointed out in the appended claims.

In the drawings in which Figs. 1-4 are illustrative of one embodiment of this invention:

Figure 1:
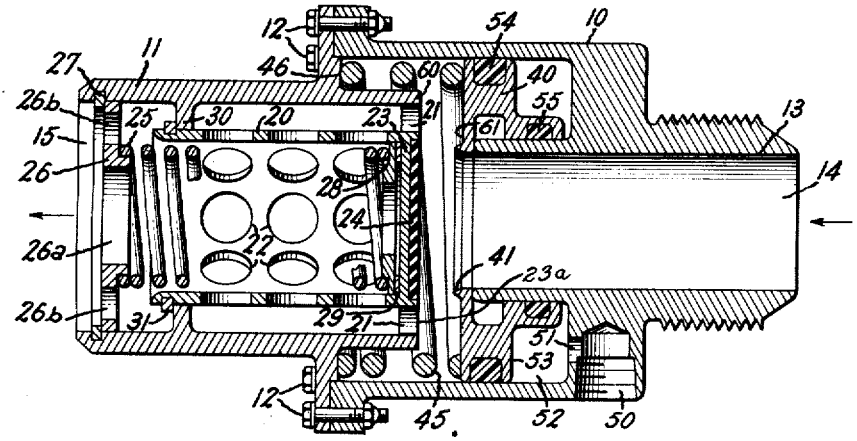
Fig. 1 is a cross sectional view of a vent and relief valve embodying the principles of this invention.

Briefly stated in accordance with one aspect of this invention, a valve body is provided having a flowway connecting inlet and outlet ports of the body. A valve seat member and a valve head member are slidably positioned in the body and cooperate to open or close the flowway. These members are biased so that the flowway is normally open. Means are provided associated with the valve body for receiving external power for moving the head member against the seat member to close the flowway and provide for relief operation of the valve. Thus, any failure of such means or of the external power merely permits return of the head member to its normally open or venting position.

The cooperating portions of the head member and the seat member are so constructed and arranged that the area acted on by the upstream pressure prior to the opening of the flowway is smaller than the area acted on by this pressure immediately after a slight opening of the flowway. These portions are also constructed and arranged so that they provide a flow restricting orifice which is effective to create a differential between the downstream pressure and the pressure existing in the vicinity of the seat portion of the valve seat member. These two features, namely, the difference in areas and the pressure differential, enable the valve to have the characteristic that the cracking pressure, that is, the pressure at which the valve is set to relieve, is the highest pressure to which the system is subjected.

Referring more particularly to the drawings illustrating the invention, the body of the combination vent and relief valve comprises two mating housing sections 10 and 11 secured together in sealed relation as by bolts 12. Housing section 10 has a centrally located hollow cylindrical extension 13 having an inlet port 14 and a central flowway. The other housing section 11 is also substantially cylindrical in shape and has a hollowed out portion including an outlet port 15. The inside surface walls of the housing section 11, the cylindrical extension 13, and, when the valve is opened, the inside surface of the housing section 10 cooperate to form a flowway through the valve body.

A valve seat member 20 is slidably positioned in the flowway provided in the valve body. This seat member 20 in the illustrated embodiment is cylindrical in shape and has guide lugs 21 extending outwardly therefrom to guide the seat member in its movement within the housing section 11 of the valve body. A plurality of bores 22 around the periphery of the seat member 20 help promote the free passage of fluid through the flowway of the valve body. A seat portion 23 is provided on the inlet side of the seat member 20 for cooperation with a valve head member to be described hereinafter. This seat portion 23 preferably comprises the closed end of the cylindrical portion of the seat member 20, and has an annular surface 23a having embedded therein a resilient seat insert 24, preferably of neoprene. It will be understood, however, that the entire seat portion 23 can be an integral part of the seat member 20 within the scope of this invention.

Biasing means in the form of a coil spring 25 is provided for urging the valve seat member 20 in the direction of the inlet port 14. The coil spring 25 is seated at one end on a spring platform 26 which in turn is held in place within the valve body by a retaining ring 27. At its other end the coil spring bears against a spring seat 28 which in turn bears against a washer-shaped shim 29 disposed between the spring seat and the internal surface of the end portion of the seat member 20. It will be noted that the number and the thickness of the shims can be selected at the time of assembling the valve to adjust the strength of the biasing force urging the seat member in the direction of the inlet port. Lugs 30 project inwardly from the valve body and cooperate with a stop ring 31 to provide a stop for limiting movement of the valve seat member 20. It will also be noted that the spring platform 26 has a central opening 26a and a number of surrounding openings 26b therein to insure the free flow of fluid through this section of the valve. The lugs 30 also help to guide the movement of the seat member 20. Thus, the seat member 20, which may be referred to as a pressure relieving valve member, encounters very low friction in its movement within the valve body, the only friction involved being the small amount developed between these lugs 30 and the seat member 20 and between the guide lugs 21 and the adjacent portions of the valve body 11.

A valve head member 40 is slidably positioned within the valve body, and has a closure portion 41 positioned to cooperate with the seat insert 24 of the seat portion annular surface 23a of the valve seat member. In the illustrated embodiment this valve head member is in the form of an annular piston positioned within the housing section 10 and surrounding the cylindrical extension 13, and the closure portion 41 comprises an annular knife-edge projection extending toward the seat insert 24 of the valve seat member 20.

Biasing means is provided for urging the valve head member 40 in the direction of the inlet port 14 to maintain the closure portion 41 of the head member and the seat portion 23 of the seat member 20 in spaced relation and thereby maintain the flowway open for the venting function. This biasing means in the illustrated embodiment is in the form of a coil spring 45 seating at one end on a shoulder 46 of the housing section 11, and at the other end bearing against the head member 40.

There is also provided in this invention means associated with the valve body for receiving external power for moving the head member against its biasing means to bring the closure portion 41 into engagement with the seat portion 23 and close the flowway through the valve body. In the embodiment shown this means is in the form of a threaded opening 50 and a passageway 51 opening into an annular chamber 52 within the housing section 10 of the valve body. Thus, the external power may be in the form of fluid under pressure introduced to the actuating port 50 to act against the piston-like surface 53 of the head member 40 to impart movement thereto. It will be noted that sealing rings 54 and 55 are provided in the head member 40 to seal the chamber 52. A stop is provided for limiting movement of the head member 40 against its biasing means, and in the illustrated embodiment this stop is in the form of a cylindrical extension 60 of the housing section 11.

Figure 4:
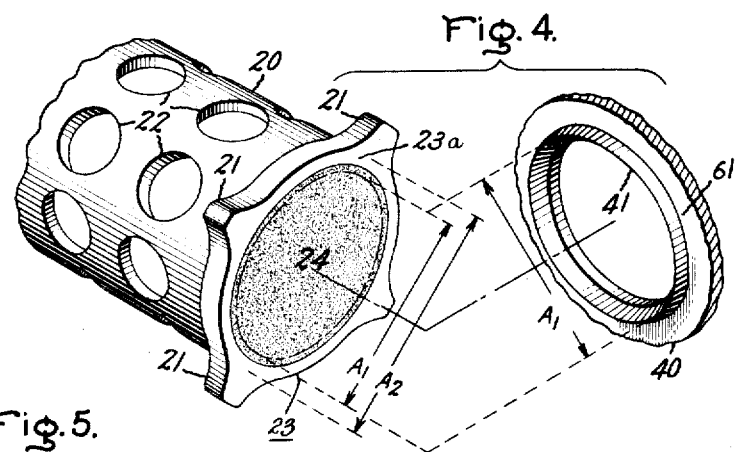
Fig. 4 is an exploded, fragmentary, perspective view of the valve seat member and the valve head member of Figs. 1-3.

Considering now Fig. 4, it will be observed that the area $A_1$ enclosed by the knife-edges of the closure portion 41 of the head member is smaller than the area $A_2$ which is the area of the annular surface 23a of the seat portion 23 of the valve seat member. It will also be observed that the annular surface of the seat portion 23 of the valve seat member cooperates with the annular surface 61 of the valve head member 40 when in a spaced relationship to form an orifice, the purpose of which is to offer a sufficient restriction to the flow of fluid through the flowway of the body as the flowway opens to create a differential in pressure between the downstream pressure and that existing in the vicinity of the closure portion. This restriction to flow can be slight in that it is only necessary that a slight differential exists. For example, if the downstream pressure, that is, at the outlet port, is atmospheric, then the pressure existing in the vicinity of the closure portion need be only slightly greater than atmospheric pressure in order to achieve the desired results, namely, a valve design exhibiting a pressure-flow relationship which is inverse compared to the normally expected relief valve pressure-flow relationship.

Figure 5:
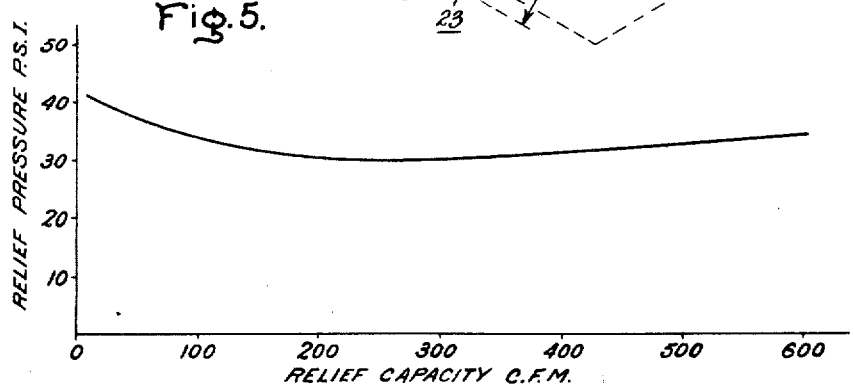
Fig. 5 is a graph showing the relation between the pressure and the flow or capacity of the illustrated embodiment of this invention under relieving conditions.

It will be seen in the graph of Fig. 5 showing the pressure-flow relationship in tests conducted on a valve embodying the principles of the present invention, that as the flow increases, the pressure decreases. Thus, when the opening or cracking pressure was set for approximately 41 lbs./sq. inch, this cracking pressure was the maximum pressure to which the system being relieved was subjected as the flow increased to as much as 600 cu. ft./min.

*Operation*

Figure 2:
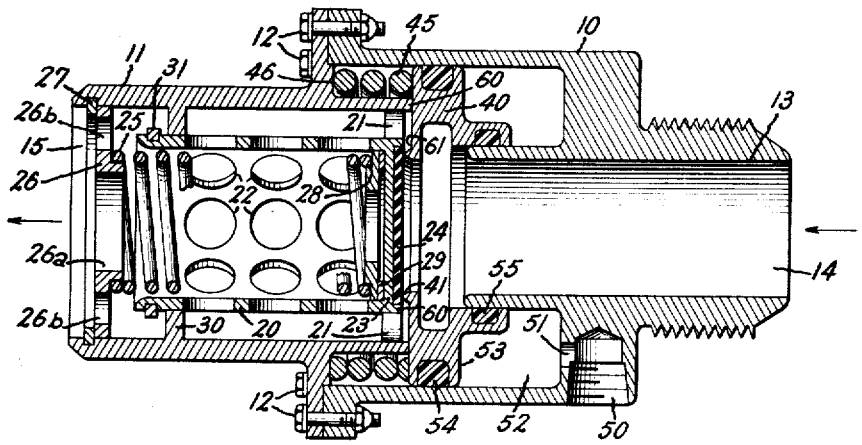
Fig. 2 is a view like Fig. 1 but showing the flowway closed.

In normal operation the head member 40 is in the venting position shown in Fig. 1. When relief operation of the valve is desired, fluid under pressure may be admitted through the actuating port 50 to the chamber 52 to act against the piston-like surface 53 of the head member 40 and move it to the position shown in Fig. 2 closing the flowway. It will be noted that in its movement to this position against the stop 60, the movable head member 40 engages the seat insert 24 of the seat member 20 through its knife-edge closure portion 41. Thus, the biasing means or spring 25 is slightly compressed and the seat member 20 is moved to a position disengaging the stop lugs 30 and the stop ring 31, so that the seat member is now held between the biasing force and the force exerted by the head member 40.

Figure 3:
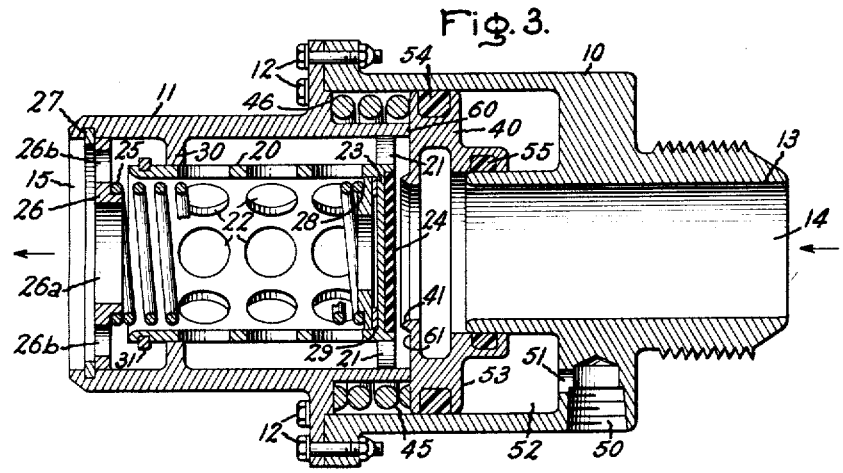
Fig. 3 is a view like Figs. 1 and 2 but showing the valve seat member moved to the relieving position and showing the flowway open.

As may be seen in Fig. 3, when the upstream pressure, that is, the pressure acting in the inlet side of the valve body, exceeds the setting of the biasing means acting on the seat member 20, the seat member 20 will be moved in the direction of the outlet port 15 to open the flowway and permit relieving of the system to which the valve is connected.

To unload or vent the pressure system to which the valve is connected, it is only necessary to release the external power (e.g. fluid under pressure) holding the head member 40 in its closed position. Thus, it will be seen that a failure of the external power operates to vent the system automatically. This feature also allows the systems to breathe when not in use and avoids a build up of pressure due to changes in ambient temperature or in pressure.

While the preferred embodiment of this invention has been illustrated and described, the invention is not limited to the embodiment shown. For example, while coil springs have been described as the preferred biasing means for the valve seat member and the valve head member, it will be understood that within the scope of this invention other means such as electromagnetic means, fluid pressure means, etc., may be used to bias these members. Also for example, the means for receiving external power to move the valve head member against its biasing means has been described as comprising an actuating port and chamber for receiving fluid under pressure. It will be understood that this means could also be comprised of electromagnetic means, etc., within the scope of the invention.

Thus, it is intended in the appended claims to cover all changes and modifications of the embodiment of the invention disclosed which do not constitute departures from the spirit and scope of the invention.

What I claim as new and desire to secure by Letters Patent of the United States is:

1. A normally open vent and relief valve adapted for connection to a pressure system comprising: a valve body including inlet and outlet ports and a flowway connecting said ports, a valve seat member slidably positioned in said body and having a seat portion including a resilient seat insert, biasing means for urging said seat member in the direction of the inlet port, a valve head member slidably positioned in said body and having a knife-edge closure portion positioned to cooperate with the resilient seat insert of the seat portion of said valve member, biasing means for urging said head member in the direction of the inlet port, an opening in the valve body connected with a piston-like surface of the head member for receiving a fluid under pressure for moving the head member toward the seat member so that said knife-edge closure portion engages said resilient seat insert of seat portion to close the flowway, whereby, when said flowway is closed, pressure exceeding a predetermined amount can act on the seat portion to move it against its biasing means and open said flowway for the relieving function, the area of said seat portion being larger than the area enclosed by said knife-edge closure portion, and the valve seat member and valve head member having portions cooperating to offer sufficient restriction to flow through said flowway as the flowway opens to create a differential between the downstream pressure and the pressure existing in the vicinity of the knife-edge closure portion, said valve thus having the characteristic that the pressure at which the valve is set to relieve is that pressure which is required to unseat the valve member against the pressure exerted by its biasing member.

2. A normally open vent and relief valve for connection to a pressure system comprising: a valve body including inlet and outlet ports, a flowway connecting said ports; a valve body including inlet and outlet ports, a flowway connecting said ports; a valve seat member slidably positioned in said flowway and having a seat portion including an annular surface facing said inlet port and a resilient seat insert forming a portion of said annular surface; biasing means urging the valve seat member in the direction of the inlet port; a stop associated with the valve body for limiting movement of the valve seat member in said direction; a valve head member slidably positioned in said body and having an annular surface in opposition to the seat member annular surface, the head member annular surface including a knife-edge closure portion positioned to cooperate with said resilient seat insert of said seat member annular surface; biasing means urging the valve head member in said direction to maintain the annular surface of the head member and the annular surface of the seat member in spaced relation with a pressure drop therebetween and thereby maintain the flowway open for venting function; an opening in the valve body connected with a piston-like surface of the head member for receiving a fluid under pressure for moving the head member against its biasing means to bring said knife-edge closure portion of the resilient seat insert of said seat member into engagement to close said flowway; a stop associated with the valve body for limiting movement of the head member caused by the fluid under pressure, whereby when said flowway is closed, pressure exceeding a pre-determined amount acts on the seat member to move said seat member against its biasing means and open said flowway for relieving function.

3. A normally open vent and relief valve for connection to a pressure system comprising: a valve body including inlet and outlet ports and a flowway therebetween; a pair of cooperating valve members slidably positioned in said body, said valve members having oppositely disposed surfaces containing closure portions for opening and closing said flowway; biasing means urging said members in the direction of the inlet port, said members and said biasing means being so positioned that the flowway is normally maintained in an open venting condition with a pressure drop between said oppositely disposed surfaces; and an opening in the valve body connected with a piston-like surface on one of said valve members for receiving a fluid under pressure for moving one of said opposing valve surfaces towards the other opposing valve surface to cause engagement of the closure portions to close the flowway, the other valve surface operative upon exposure to pressure exceeding a predetermined amount to move the other valve member away from said one valve member to relieve the system to which the valve may be connected.

References Cited in the file of this patent
UNITED STATES PATENTS

| | | |
|---|---|---|
| 1,483,240 | Olson | Feb. 12, 1924 |
| 1,493,774 | Dorsey | May 13, 1924 |
| 2,418,440 | White | Apr. 1, 1947 |
| 2,467,635 | Sogorka | Apr. 19, 1949 |
| 2,502,279 | Road | Mar. 28, 1950 |
| 2,538,436 | Weinberg | Jan. 16, 1951 |
| 2,747,802 | Kmiecik | May 29, 1956 |

FOREIGN PATENTS

| | | |
|---|---|---|
| 327,472 | Great Britain | Apr. 10, 1930 |